United States Patent [19]
Chen

[11] Patent Number: 5,687,309
[45] Date of Patent: *Nov. 11, 1997

[54] FAULT TOLERANT COMPUTER PARALLEL DATA PROCESSING RING ARCHITECTURE AND WORK REBALANCING METHOD UNDER NODE FAILURE CONDITIONS

[75] Inventor: Jason S. Chen, San Marino, Calif.

[73] Assignee: Sybase, Inc., Emeryville, Calif.

[*] Notice: The term of this patent shall not extend beyond the expiration date of Pat. No. 5,561,759.

[21] Appl. No.: 721,295

[22] Filed: Sep. 26, 1996

Related U.S. Application Data

[63] Continuation of Ser. No. 573,905, Dec. 18, 1995, Pat. No. 5,561,759, which is a continuation of Ser. No. 173,781, Dec. 27, 1993, abandoned.

[51] Int. Cl.⁶ .................................................. G06F 11/20
[52] U.S. Cl. ........................................................ 395/182.02
[58] Field of Search ........................ 395/182.02, 200.06, 395/200.11, 200.21, 293, 299, 730, 731; 364/285.1, 285.3, 281.9, 268.9, 229.3, 230.3, 268.3

[56] References Cited

U.S. PATENT DOCUMENTS

| | | | |
|---|---|---|---|
| 4,412,281 | 10/1983 | Works | 364/200 |
| 4,868,818 | 9/1989 | Madan et al. | 371/11.3 |
| 5,089,958 | 2/1992 | Horton et al. | 395/575 |
| 5,251,205 | 10/1993 | Callon et al. | 370/60 |
| 5,430,727 | 7/1995 | Callon | 370/85.13 |
| 5,561,759 | 10/1996 | Chen | 395/182.02 |

OTHER PUBLICATIONS

"Guardian 90 Operating System" Tandem Computers, pp. 1–7, 1985.

"A Performance Study of Three High Availability Data Replication Strategies", Hsiao et al., pp. 18–28, 1991, IEEE.

Hsiao, H. and DeWitt, D.J., "A Performance Study of Three High Availability Data Replication Strategies," IEEE, 1991, pp. 18–28.

"Guardian 90 Operating System," Tandem Computers Incorporated, 1985, pp. 1–7.

*Primary Examiner*—Robert W. Beausoliel, Jr.
*Assistant Examiner*—Stephen C. Elmore
*Attorney, Agent, or Firm*—John A. Smart

[57] ABSTRACT

Method and system for distributing prefragmented data processing loads in a fault tolerant system linked in a ring topology of disk subsystems and data processing nodes. The data processing load of the node under fault is shifted in one direction along the ring, and adjacent nodes in the same direction along the ring successively shift their entire data processing loads to their immediately adjacent data processing nodes. The adjacent data processing nodes in the non-shifted direction absorb increased workloads by one net data fragment each. Each successive data processing node away from the node under fault absorbs an increasing number of data fragments from its adjacent data processing node until the entire data processing load of an adjacent data processing node is absorbed.

17 Claims, 3 Drawing Sheets

FAULT TOLERANT COMPUTER PARALLEL DATA PROCESSING RING ARCHITECTURE AND WORK REBALANCING METHOD UNDER NODE FAILURE CONDITIONS

This is a Continuation Patent Application of application Ser. No. 08/573,905, filed Dec. 18, 1995, now U.S. Pat. No. 5,561,759, issued Oct. 1, 1996, which is a Continuation Patent Application of application Ser. No. 08/173,781, filed Dec. 27, 1993, now abandoned.

BACKGROUND OF THE INVENTION

This invention relates generally to storage architectures for parallel data processing systems and methods for balancing work load after node failure.

Parallel data processing systems of many kinds are known. Data in parallel data processing systems of the prior art is partitioned into the data fragments which are distributed among a plurality of data storage elements such as hard disks. For purposes herein, the meaning of the words "disk subsystems" and "storage subsystems" are defined to be interchangeable. By distributing the data fragments over a number of data storage elements, corresponding multiple threads of computation are created at multiple data processing nodes to access the multiple data fragments in parallel.

A major object of parallel data processing systems is fault tolerance. A fault tolerant system is defined as a system designed to continue operation in the event of a fault of one or more components. Parallel data processing systems are often employed in "mission critical" application environments. As is well known, in any given system, the mean time between failure is inversely proportional to the number of components in the system. Accordingly, in a parallel system with a large number of components, component failures can be expected to occur frequently. Accordingly, one object of the invention herein is graceful performance degradation after occurrence of a component failure.

FIG. 1 shows, in block diagram form, the general scheme of a fault-tolerant parallel data processing system 10. The fault-tolerant parallel data processing system 10 includes a plurality of disk subsystems 11, 12. For simplicity in illustration, two disk subsystems are shown in FIG. 1. The fault tolerant parallel data processing system 10 further includes a plurality of data processing nodes 14, including, in the example shown, data processing nodes 14a, 14b, 14c, and 14d. These data processing nodes are connected to disk subsystems 11, 12 along busses 15. In particular, data processing nodes 14a and 14b are connected to disk subsystem 11, and data processing nodes 14c and 14d are connected to disk subsystem 12, each along a separate bus 15. Data processing system 10 further includes an interconnection system 16 to which each of data processing nodes 14 are connected to establish an integrated parallel data processing system. As illustrated in FIG. 1, data processing nodes 14 are grouped into disjoint pairs. Each pair of data processing nodes is connected to a shared single disk subsystem, i.e., one of disk subsystems 11 or 12. Disk subsystems 11 and 12, according to this approach, mirror each other, containing replicated data or information sets. Such disk mirroring protects the data processing system 10 from a single disk failure. In case of a processing node failure as to a particular data processing node 14a, for example, the other processing node of the pair, i.e., processing node 14b, can take over the work load of the faulty node, because both data processing nodes have access to the shared disk subsystem, in this case disk subsystem 11.

However, the performance of the parallel processing system 10 may drop as much as half because the performance of a loosely-coupled parallel system such as data processing system 10 in FIG. 1 typically depends upon the performance of the slowest processing node in the data processing system 10.

The problem of unbalanced work load after component failure in a fault tolerant system has also been addressed by allowing more than two data nodes to be connected to a single, shared disk subsystem. However, the bandwidth of the bus connecting the data processing nodes and the disk subsystems becomes a limiting factor in performance. Having more than two data processing nodes connect to a larger disk subsystem usually does not scale up system performance very much. Thus the indicated approach appears to contradict the performance motivation behind designing current parallel system architectures.

Another approach to the problem of fault tolerance in parallel processing systems has been attempted by parallel architectures which rely upon multistage interconnection topologies to provide shared access from every processing node to every device in the storage subsystem. However, this approach is costly and may yield unpredictable input/output performance.

It is an object of the invention to develop a simple yet effective architectural approach to fault-tolerance in parallel processing systems.

Another object is to provide a method for redistributing the workload of a failed processing node to adjacent operating data processing nodes in a manner which minimizes the overall system performance reduction caused by the redistributed workload.

SUMMARY OF THE INVENTION

The storage architecture of the invention addresses the problem of a processing load imbalance occurring when a particular data processing node of a distributed processing node architecture fails. In the architecture of the invention, load imbalances caused by a fault condition at a particular processing node are resolved by interconnecting the data processing nodes and disk subsystems into a ring topology. Each of the disk subsystems is connected to and shared by two data processing nodes. Each of the data processing nodes is connected to two shared disk subsystems as well. This additional connectivity allows an improved balancing of system work load in the event of node failure. Therefore, better system performance can be achieved in that situation.

The data stored in the disk subsystems is partitioned into fragments, and the fragments are distributed among the disk subsystems so that multiple threads of computation are enabled to permit access to multiple fragments of data in parallel. When a node failure occurs, the work load of that node is taken over by an adjacent node. To avoid doubling the workload of the adjacent node (and thus reducing system performance by one half), all or part of its own prior workload is taken away and provided to the next in order data processing node. Because of the additional connectivity provided by the invention, substantial shifting of some or all of the workload of successive data processing nodes takes place. Accordingly, a workload propagation occurs in the ring topology architecture of the invention which permits a deskable load balance to be accomplished.

In the ring topology architecture according to the invention, the data processing nodes and storage subsystems of the architecture are interconnected with a single bus structures or more complicated bus structures which in and of themselves are well-known, taken alone. When a particular data processing node fails, the ring topology architecture is broken into one or more chains of data processing nodes and storage subsystems with the end points of each chain being two storage subsystems connected to a particular failed node. According to one version of the invention, the data processing workload of a particular failed node is redistributed as to the particular data fragments in the failed data processing node among the data processing nodes comprising a particular chain associated with the failed node. In one version, the data fragments are redistributed substantially evenly over the data processing nodes of a particular chain. By substantially evenly it is meant that the increased data processing load of any particular data processing node of a chain will not deviate from the data processing node of any other data processing node in a particular chain by more than one data processing fragment.

A parallel data processing system of the invention may have N data processing nodes and N disk subsystems, for example, and the data processing nodes and the disk systems can be numbered from zero (i.e., 0) to N1 for convenience. A particular disk subsystem may additionally incorporate a multiplicity of interconnected disks and disk systems. The system may additionally be partitioned into F*N data fragments which are preferably evenly distributed across the N disk subsystems. Initially, the data fragment I is assigned to a disk subsystem I/F. When a particular processing node X fails, the work load with respect to a particular data fragment I may be assigned to a different node. For example, for G=(F*N)/(N−1), M=(F*N) mod (N−1), and J=(I−F*(X+1)) mod (F*N), a particular data fragment I is assigned to processing node Y=(X+1+M+(J−M*(G+1))/G) mod N, if J>=(G+1)*M. Alternatively, if J is <(G+1)*M, data fragment I may be assigned to processing node Y=(X+1+J/(G+1)) mod N.

These and other features and advantages of the present invention will become apparent from the following detailed description and drawings.

DETAILED DESCRIPTION OF THE PREFERRED EMBODIMENTS

Figure 1:
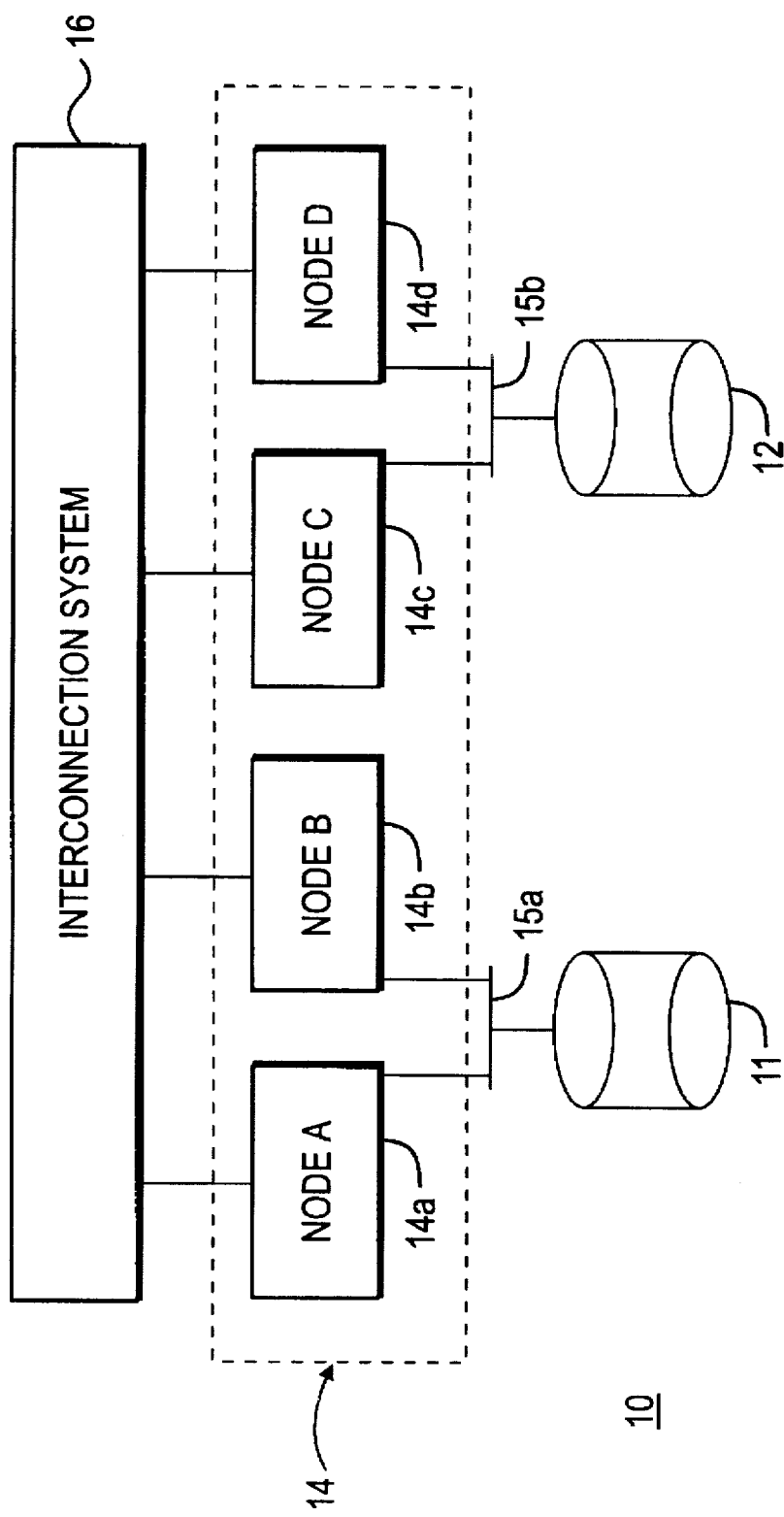
FIG. 1 shows a parallel data processing system according to the prior art which is loosely coupled with the disk subsystems being shared by two data processing nodes.
Figure 2:
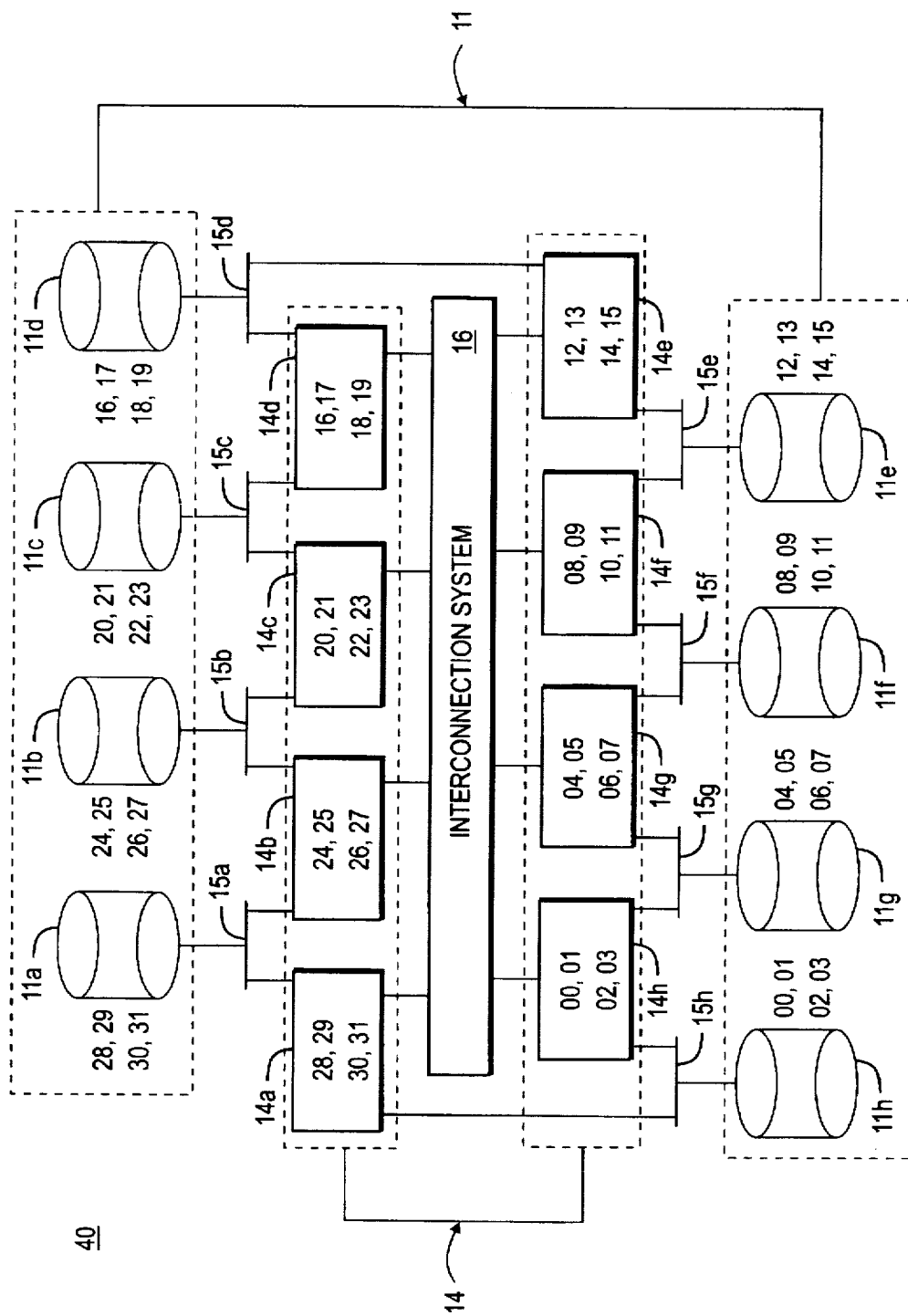
FIG. 2 shows a parallel data processing system according to the invention which has a ring pattern connectivity topology between disk subsystems and data processing nodes.

FIG. 2 shows a parallel data processing system 40 including a plurality of disk subsystems 11. For simplicity in illustration, eight disk subsystems 11 are shown in FIG. 2. Data processing system 40 further includes a plurality of data processing nodes 14, including in particular data processing nodes 14a, 14b, 14c, 14d, 14e, 14f, 14g, and 14h. These data processing nodes 14 are connected to disk subsystems 11 along respective busses 15. Each of busses 15 may actually be a bus system or a plurality of busses according to any one of a number of well-known bus schemes. Further, each disk subsystem 11 may incorporate one or more disk subsystems of varying size or capacity.

Data processing nodes 14a and 14b are connected to disk subsystem 11a; data processing nodes 14b and 14c are connected to disk subsystem 11b; data processing nodes 14c and 14d are connected to disk subsystem 11c; data processing nodes 14d and 14e are connected to disk subsystem 11d; data processing nodes 14e and 14f are connected to disk subsystem 11e; data processing nodes 14f and 14g are connected to disk subsystem 11f; data processing nodes 14g and 14h are connected to disk subsystem 11g, and data processing nodes 14h and 14a are connected to disk subsystem 11h, each along a respective separate bus 15.

Data processing system 40 further includes an interconnection system 16 to which each of data processing nodes 14 is connected to establish a unitary, parallel data processing system. In accordance with the invention, respective disk subsystems 11 are loaded with the data fragments as shown in FIG. 2. Each of disk subsystems 11 may for example contain four data fragments, each of the data fragments being substantially equal in storage size. As the arrangement of data processing system 40 shown in FIG. 2 includes eight disk subsystems 11 and each of disk subsystems 11 contains four data fragments, a total of 32 data fragments, numbered 00 to 31, are loaded into respective disk subsystems 11. As shown in FIG. 2, the data fragments numbered 00 through 03 are loaded into disk subsystem 11h, the data fragments numbered 04 through 07 are loaded into disk subsystem 11g, the data fragments numbered 08 through 11 are loaded into disk subsystem 11f, the data fragments numbered 12 through 15 are loaded into disk subsystem 11e, the data fragments numbered 16 through 19 are loaded into disk subsystem 11d, the data fragments numbered 20 through 23 are loaded into disk subsystem 11c, the data fragments numbered 24 through 27 are loaded into disk subsystem 11b, and the data fragments numbered 28 through 31 are loaded into disk subsystem 11a. Additionally, in accordance with the interconnection scheme of data processing nodes 14 with disk subsystems 11, it is clear that barring loss of a particular one of data processing nodes 14a through 14h, the initially assigned data fragments will be processed by the data processing node which is primarily associated with a given disk subsystem 11. In particular, data processing node 14a will process the data fragments 28 through 31 of disk subsystem 11a; data processing node 14b will process the data fragments 24 through 27 of disk subsystem 11b; data processing node 14c will process the data fragments 20 through 23 of disk subsystem 11c; data processing node 14d will process the data fragments 16 through 19 of disk subsystem 11d; data processing node 14e will process the data fragments 12 through 15 of disk subsystem 11e; data processing node 14f will process the data fragments 08 through 11 of disk subsystem 11f; data processing node 14g will process the data fragments 04 through 07 of disk subsystem 11g; and data processing node 14h will process the data fragments 00 through 03 of disk subsystem 11h. As is apparent from FIG. 2, a ring-pattern interconnection path or topology is established according to the invention by busses 15 connecting adjacent disk subsystems 11 to associated ones of data processing nodes 14.

Figure 3:
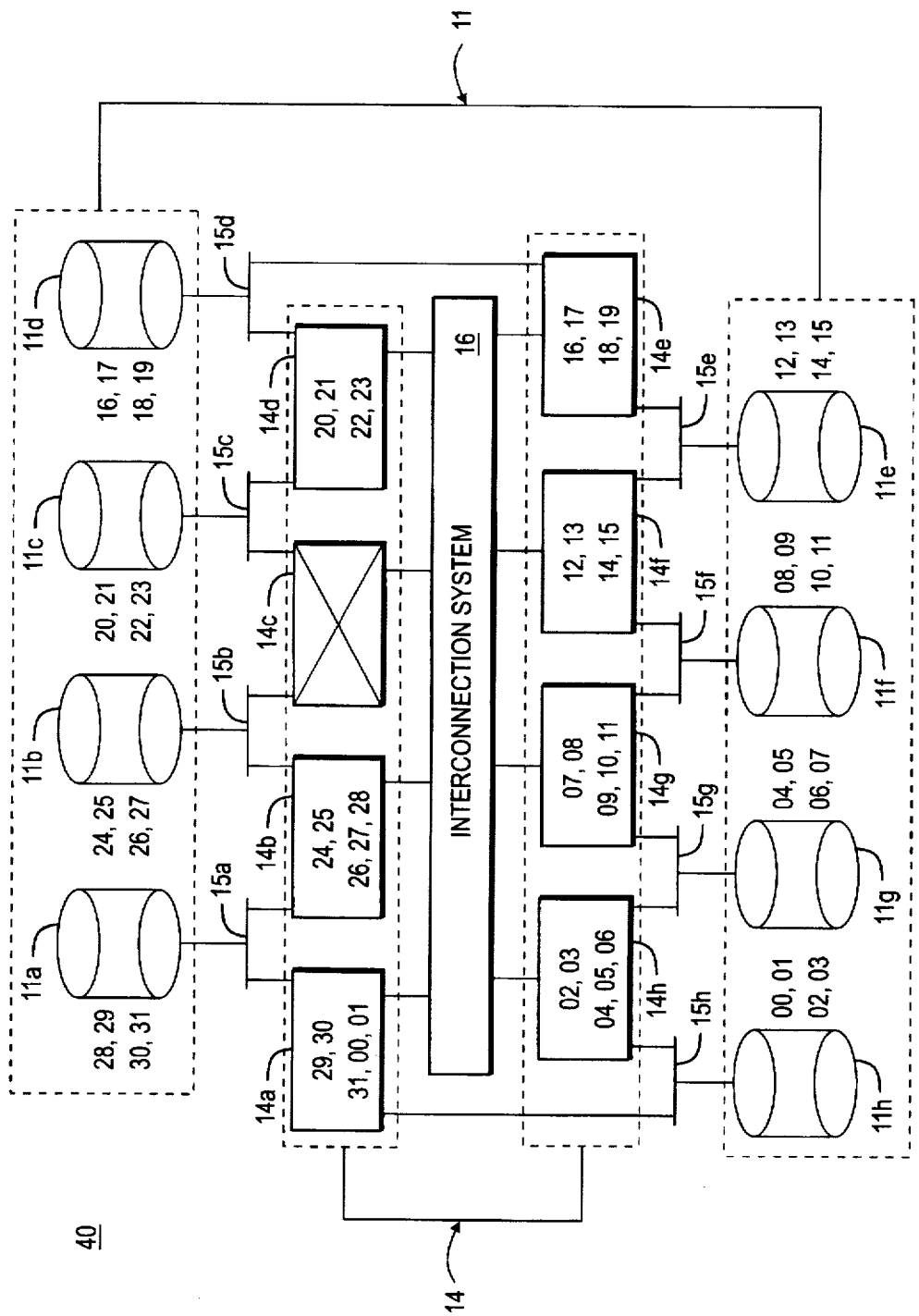
FIG. 3 shows the parallel data processing system according to FIG. 2, with a selected processing node experiencing fault conditions and with the workload redistributed in accordance with the invention.

FIG. 3 shows parallel processing system 40 according to FIG. 2 with a selected data processing node 14c experiencing a fault condition and with the workload with respect to processing data fragments numbered 20, 21, 22, and 23 being redistributed in accordance with the invention. The general interconnection scheme of FIG. 2 is repeated in FIG. 3, but the assignment of data fragments to data processing nodes 14 is accomplished in accordance with the invention. In particular, with the failure of data processing node 14c and its inability to accomplish data processing activities on data fragments 20 through 23 initially assigned to it, it becomes necessary to reallocate data processing responsibility for these particular data fragments to enable overall system performance to continue close to as effectively as before. Further according to the invention, the entire workload of the defaulting data processing node is reassigned to another data processing node, which according to a version of the invention, is an immediately adjacent data processing node. According to one version of the invention, the processing load is shifted clockwise, or to the right. Alternatively, the shift could occur in a counterclockwise or leftward direction.

Notably, the mere shift of the entire data processing load of the data processing node 14c in fault would double the workload of the selected immediately adjacent data processing node (in this case data processing node 14d). However, according to the invention, the receiving node, i.e., 14d, is also relieved of at least a portion of its formerly assigned data fragments. In the instance shown in FIG. 3, it is relieved of all of the formerly assigned data fragments, these being transferred to data processing node 14e.

Additionally according to one version of the invention, an increased data processing load is accepted by at least one data processing node 14 in the direction opposite to the one toward which the data processing load of the data processing node 14c in fault is shifted. As shown in FIG. 3, the data processing node 14b immediately to the left and counterclockwise from the data processing node 14c in fault, is provided with an additional data fragment for data processing from data processing node 14a adjacent to it in a direction away from the data processing node 14c in fault. Accordingly, the data processing load of data processing node 14b is increased 25% in this instance by the addition of a single new data fragment, i.e., data fragment 28 from data processing node 14a. This of course reduces the data processing load of data processing node 14a by one data fragment, leaving it with only three data fragments to process, namely data fragments 29, 30, and 31 (data fragment 28 having been transported to data processing node 14b). However, according to the invention, the data processing load of data processing node 14a is maintained at the same level as the increased data processing load level of data processing node 14b, which is tasked with processing five data fragments (data fragments number 24, 25, 26, 27, and 28). Accordingly, to increase the data processing load of data processing node 14a from three fragments to five fragments, two data fragments are transported from data processing node 14h to data processing node 14a, namely data fragments 00 and 01, resulting in a data processing load for data processing node 14a of five data fragments (29, 30, 31, 00, and 01).

The bi-directional reallocation of data fragments indicated above is accomplished successively around the ring topology in respective clockwise and counterclockwise directions. In one direction (counterclockwise according to one version of the invention), an increased workload of one fragment of data from processing node 14c is accepted for a number of data processing nodes equal to the number of data fragments initially processed by the data processing node 14c in fault. In the other direction (clockwise, according to one version of the invention), the entire workload is simply repeatedly shifted down the line within the ring topology until, in a final shift, a data processing node with an increased workload (i.e., node 14g in FIG. 3) simply absorbs the entire shifted load of data fragments (from node 14f) while additionally continuing to process only one of its former data processing fragments (i.e., fragment 07). According to another version of the invention, the shifting of the entire workload of a particular data processing node in fault is shifted repeatedly in a counterclockwise direction, while the data processing nodes 14 in a clockwise direction would be tasked with an incrementally increased workload, the increment of increase being a single net fragment greater than the original workload. In this clockwise direction, entire workloads are not shifted, but individual data fragments are shifted, in increasing numbers, until a number of data fragments one less than the normal data processing load in a data processing node 14 is achieved. The first data processing node 14 which retains only a single one of its former data fragments is also the first data processing node with an increased workload which is not immediately adjacent to the data processing node in fault.

This reallocation of data fragments can be stated according to an expression as indicated below. The load balance relationship expresses the approach of the invention in effectively balancing the data processing load of a plurality of data processing nodes connected to disk subsystems as described herein. The additional connectivity of the busses 15 according to the invention is effective for establishing a ring topology in which each data processing node 14 is connected to an adjacent pair of disk subsystems 11, and each disk subsystem 11 is connected to an adjacent pair of data processing nodes 14. Each disk subsystem 11 may include multiple disks and busses in subsidiary disk subsystems. According to this connectivity scheme, the last data processing node is connected to the first and last disk subsystem in order to complete the ring topology, and similarly the last disk subsystem is connected to both the first and last data processing nodes to complete the ring topology. The indicated connectivity further permits data processing nodes 14 to shift some or all of the local, pre-fault data processing load to an adjacent data processing node, thereby achieving work load propagation which continues throughout the ring topology and permits an improved load balance scheme to be achieved.

A relationship according to which the invention herein can be implemented is developed as follows. Assume a particular data processing system has "N" data processing nodes 14. These data processing nodes 14 can be numbered from zero (i.e., 0) through "N−1." Further assume the same number "N" of disk subsystems 11. These can similarly be numbered from zero (0) to "N−1." The interconnection scheme of these respective data processing nodes 14 and disk subsystems 11 is according to FIGS. 2 and 3. Further assume that the data entered onto disk subsystems 11 is partitioned into a plurality of substantially equally sized data fragments. In particular, there are F*N data fragments, with F being the number of data fragments allocated to a particular disk subsystem 11 for data processing at an associated data processing node 14. The total number of data fragments is F*N, and fragment I, i.e., the (I−1)th data fragment, is assigned to disk subsystem I/F during no-fault conditions. Note that the numbering of data fragments begins with 0 and continues to F*(N−1). According to this scheme, data fragments 0 through F−1 reside on the first disk subsystem; fragments F through 2*F−1 reside on the second disk subsystem; and so on, until finally, fragments 7F through 8F−1 reside on the eighth subsystem. During normal operation during which no data processing nodes 14 are in fault, the work load corresponding to a particular data fragment I is assigned to data processing node I/F. Simply stated, each data processing node 14 is responsible for the work load on the disk subsystem having the same identifier.

However, when a particular data processing node X fails or experiences fault conditions, the work load as to a particular data fragment I is subject to assignment to an adjacent data processing node in accordance with the following expressions and values. In particular, N is an integer equal to the number of data processing nodes and equal to the number of data storage or disk subsystems. Further, F is the integer number representing the constant number of data fragments assigned to a particular disk subsystem or data processing node during non-fault, or normal operating conditions. The (X−1)th data processing node, i.e., node X, is deemed to be in fault. The data fragments numbered are then assigned for continued data processing in accordance with the following two expressions which apply in opposite directions ringwise from the data processing node experiencing fault conditions. The expressions which follow identify the data processing node to which the Ith data fragment is assigned.

In particular, for $J>=(G+1)*M$, where $G=(F*N)/(N-1)$, $M=(F*N)\mod(N-1)$ and $J=(I-F*(X+1))\mod(F*N)$, the data processing node Y to which data fragment I is assigned is given by the expression:

$$Y=(X+1+M+(J-M*(G+1))/G)\mod(N).$$

Additionally, for $J<(G+1)*M$, where again $G=(F*N)/(N-1)$, $M=(F*N)\mod(N-1)$, and $J=(I-F*(X+1))\mod(F*N)$, the data processing node Y to which the Ith data fragment is assigned is given by the expression:

$$Y=(X+1+J/(G+1))\mod(N)$$

These expressions can be understood in connection with the following two examples and FIGS. 2 and 3:

EXAMPLE 1

According to this first example, F=4 and N=8 in accordance with FIGS. 2 and 3, in which the number of data fragments F=4, and the total number of data processing nodes 14 is eight, i.e., N=8.

First, we calculate the value of $G=(F*N)/(N-1)$. In this example, $G=(4*8)/7$ or $G=32/7$, leading to the result of 4.

Additionally, $M=(F*N)\mod(N-1)$, with the result that $M=(4*8)\mod(7)$ or $M=32\mod(7)$, leading to the result that M=4, because in accordance with modular mathematics, the remainder after determining that 32 can be divided by 7 four times, is 32−28, or 4, with the result, as indicated, that M=4.

For purposes of this example, we assume that I=28. In other words, we are interested in what becomes of the particular data fragment referred to as the 29th data fragment displayed in FIG. 2. By reference to FIG. 2, it is apparent that the I=28 data fragment is initially (under non-fault conditions) assigned to processing node 14a. This is processing node 7 for purposes of this mathematical example, for which we begin the count of data nodes with the lowest and leftmost data processing node, as it contains the lowest numerical value data fragments, namely data fragments 00, 01, 02, and 03. FIG. 3 suggests that data fragment 28 is shifted from data node 14a to data node 14b, i.e., from processing node 7 to processing node 6, when processing node 5, i.e., data node 14c, enters into fault conditions. This is the result to be verified mathematically according to this example.

Accordingly, we ascertain the value of J in accordance with the expression $J=(I-F*(X+1))\mod(F*N)$, where I=28 by our selection of the 29th data fragment as being of interest, and X=5, by virtue of the assumption that the sixth data node is in fault, consistent with FIG. 3. Consequently, $J=(28-4*(6))\mod(32)$ or J=4. Therefore, $J<(G+1) *M$ or J<20. So, $Y=(X+1 +J/(G+1))\mod(n) =(5+1+4/(4+1))$ mod (8)=6. This is correct because node 6 is actually the 7th node.

EXAMPLE 2

According to this second example, F=4 and N=8, again in accordance with FIGS. 2 and 3, in which the number of data fragments F=4, and the total number of data processing nodes 14 is eight, i.e., N=8. Additionally, $G=(F*N)/(N-1)= (4*8)/7=4$. Further, $M=(F*N)\mod(N-1)$, with the result, as before, that $M=(4*8)\mod(7)$ or $M=32\mod(7)$, leading to the result that M=4, because in accordance with modular mathematics, the remainder after determining that 32 can be divided by 7 four times, is 32−28, or 4, with the result, as indicated, that M=4. Further, $J=(I-F*(X+1))\mod (F*N)= (20-4*(6))\mod(32)=(-4)\mod(32)=28$. Therefore, $J>(G+1) *M$ or J>20. So, $Y=(X+1+M+(J-M *(G+1))/G)\mod(n)=(5+ 1+4+(28(4*(4+1))/4)\mod(8)=(12)\mod(8)=4$. This is correct, because node 4 is actually the 5th node.

In summary, the invention herein is effective for distributing prefragmented data processing loads in a fault tolerant system linked in a ring topology of disk subsystems and data processing nodes. The data processing load of the node under fault is shifted in one direction along the ring. Adjacent nodes in the same direction along the ring successively shift all or part of their data processing loads to their immediately adjacent data processing nodes. The adjacent data processing nodes in the non-shifted direction absorb increased workloads by one or more data fragment each. Each successive data processing node away from the node under fault absorbs an increasing number of data fragments from its adjacent data processing node until the entire data processing load of an adjacent data processing node is absorbed.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. In a computer system comprising a plurality of processing nodes and a plurality of more than two disk subsystems, a method for providing fault-tolerant data processing, the method comprising:

(a) partitioning data storage into groups of predetermined numbers of data fragments;

(b) interconnecting said plurality of disk subsystems with said plurality of nodes to form a topology where each node has a first neighbor connected in a first direction and a second neighbor connected in a second direction, such that each of said nodes is connected only to a single pair of disk subsystems, such that each of said disk subsystems is connected only to a single pair of nodes, and such that the data fragments being processed by any given one of said nodes during no-fault conditions are accessible by the given node's first neighbor;

(c) experiencing a fault condition at a particular one of said nodes; and (d) smiling processing of the data fragments such that the data fragments that were being processed by said particular node are processed by said particular node's first neighbor without moving the data fragments between disk subsystems, and at least some of the data fragments that were being processed by said particular node's first neighbor are processed by said particular node's first neighbor's first neighbor, wherein data processing loads can be balanced over said nodes during both fault and no-fault conditions on both sides of said particular node.

2. The method of claim 1, wherein said interconnecting steps includes interconnecting said nodes and said disk subsystems in a single bus structure.

3. The method of claim 1, wherein when said particular one of said nodes experiences a fault condition, said topology is broken into one or more chains comprising disk subsystems and other nodes connected to the particular node.

4. The method of claim 1, wherein when said particular node experiences a fault condition, data processing workload of said particular node is redistributed among other nodes which comprise a particular chain associated with said particular node which has experienced a fault condition.

5. The method of claim 4, wherein when said particular node experiences a fault condition, said data processing workload of said particular node is redistributed substantially evenly over said other nodes of said particular chain.

6. The method of claim 4, wherein when said particular node experiences a fault condition, said data processing workload of said particular node is redistributed such that data processing workload any particular node of said particular chain does not deviate from the data processing workload of any other node of said particular chain by more than one data fragment.

7. The method of claim 1, wherein said system processes said data fragments in parallel.

8. The method of claim 1, wherein all of said data fragments are substantially equal in size.

9. The method of claim 1, wherein each node of the system is primarily associated with a particular disk subsystem, so that before a fault occurs data fragments stored on a given disk subsystem are initially processed by the node with which the disk subsystem is primarily associated.

10. The method of claim 1, wherein said shifting processing step includes:

shifting processing of data fragments of said particular node in a clockwise manner to said particular node's first neighbor on the right.

11. The method of claim 1, wherein said shifting step includes:

shifting processing of data fragments of said particular node in a counter-clockwise manner to said particular node's first neighbor on the left.

12. The method of claim 1, wherein said at least some of the data fragments that were being processed by said particular node's first neighbor comprise:

all of the data fragments that were being processed by said particular node's first neighbor.

13. The method of claim 1, wherein said shifting step includes:

shifting processing of some of the data fragments of the node experiencing a fault condition clockwise to said particular node's first neighbor on the right and shifting processing of others of said particular node's data fragments counter-clockwise to said particular node's first neighbor on the left.

14. The method of claim 1, wherein said shifting step includes:

shifting processing of data fragments of the particular node experiencing a fault condition repeatedly to successive neighbors within the topology until all data fragments of said particular node experiencing a fault condition are being processed by said particular node's first neighbor, so that increased processing resulting from the fault is evenly absorbed by others of said nodes.

15. The method of claim 1, wherein said shifting step includes:

shifting processing of data fragments such that only an incremental increase in workload results at each node other than the particular node, said incremental increase being equal to processing for a single data fragment greater than that originally being processed.

16. The method of claim 1, wherein said data fragments are distributed among said disk subsystems so that multiple threads of computation are enabled to permit access to multiple fragments of data in parallel.

17. The method of claim 1, wherein said topology comprises a ring topology.

* * * * *